United States Patent Office 3,127,381
Patented Mar. 31, 1964

3,127,381
PROCESS FOR THE MANUFACTURE OF VINYL ESTER POLYMERS IN THE PRESENCE OF ALKYL BORON/BOROXOLE CO-CATALYST
Werner Ehmann and Karl-Heinz Kahrs, Frankfurt am Main, Germany, assignors to Farbwerke Hoechst Aktiengesellschaft vormals Meister Lucius & Bruning, Frankfurt am Main, Germany, a corporation of Germany
No Drawing. Filed Sept. 30, 1960, Ser. No. 59,511
Claims priority, application Germany Oct. 3, 1959
8 Claims. (Cl. 260—85.7)

The present invention relates to a process for the manufacture of vinyl ester polymers.

Vinyl esters are usually polymerized or copolymerized using peroxides, such as benzoyl peroxide, lauroyl peroxide or azo-compounds, for example azo-bis-isobutyronitrile. Percompounds, such as potassium or ammonium persulfate are also used for carrying out polymerization or copolymerization in the aqueous phase.

Activation by peroxides involves the disadvantage that acids which partially act as inhibitors are formed. Furthermore, the acid number of the resulting polymers is inadmissibly increased when a larger proportion of peroxide is used. Still further, a series of peroxides, for example benzoyl peroxide, undergo decomposition only at higher temperatures, for instance at 60–80° C., so that polymerization must be carried out within said temperature range in order to obtain industrially useful conversion rates. Finally, those groups which are incorporated by the peroxides are often undesired in the polymers.

Azo-compounds involve splitting off of nitrogen which is often disadvantageous and leads in bulk polymerization to polymers including numerous small bubbles.

The above two groups of activators can only be used for making polyvinyl esters which are substantially branched, especially in that case where high conversion rates are obtained in polymerization.

Attempts have therefore been made to polymerize vinyl esters, for example vinyl acetate and its higher homologs, using catalysts other than mentioned above.

In German Patent 1,060,601 is described a process for initiating the polymerization of vinyl esters by organic hyponitrites. These compounds are, however, difficult to prepare and very dangerous to handle, especially in view of their explosivity.

Attempts have also been made for several years with the aim to activate vinyl esters using boron organic compounds. The polymerization of vinyl with boron triethyl in hexane is described in an article published in "Journal of Polymer Science," vol. XXVI No. 113, pages 234 et seq. (1957). The statements made in that article reveal that the catalyst must be used in extraordinary great proportions, i.e. about 10%, calculated on the weight of monomers used, that is to say the use of so great amounts of expensive boron compounds renders this process less economic.

In a detailed publication in "Kunststoff-Rundschau," volume 4, April 1959, pages 139 et seq., K. H. Krause reported on the use of trialkyl boranes as catalysts in vinyl polymerization. Table 1 published in that article shows that trialkyl boranes as polymerization catalysts involve only small yields of polymer. The polymerization can be further activated by adding oxygen or oxygen-containing compopnds whereby the yield of polymer is increased to 40% or 66%, respectively, or by using copper, manganese or vanadium oxides as co-catalyst. In this latter case, the polymers are obtained in a yield of between 13–23%. Polymer yields as high as 70% or more can only be obtained according to K. H. Krause (loc. cit) using compound such as $(n-C_4H_9)_2BOB(n-C_4H_9)$ or $(n-C_4H_9)_2BO—n-C_4H_9$ which, however, are substantially more difficult to prepare. In this case, polymerization is carried out for 20 hours, i.e. for a very long period of time.

We have now found that in polymerizing vinyl esters, especially esters of vinyl alcohol with saturated aliphatic monocarboxylic acids containing 1–8 carbon atoms in a straight or branched chain, for example vinyl formate, vinyl propionate, vinyl butyrate, vinyl isobutyrate, vinyl octoate or advantageously vinyl acetate, in the presence of small amounts of boron compounds, high yields of polymer can be obtained even at polymerization temperatures as low as 40% C., for example, by adding a small proportion of boroxoles as co-catalyst to simple boron alkyls. According to this invention, vinyl esters can be polymerized as such or in admixture with one another, or one or more vinyl esters can be copolymerized with other copolymerizable monomers, for example vinyl monomers, such as acrylic acid esters or methacrylic acid esters and vinyl chloride, especially esters of acrylic acid with saturated aliphatic, monohydric alcohols containing 1–8 carbon atoms in a straight or branched chain. In copolymerizing vinyl esters with other monomers, the monomer mixture should advantageously consist to an extent of at least 50% by weight of one or more vinyl esters.

As boroxoles there may be used more especially the relatively stable n-butylboroxole which can be obtained from butylboric acid with the aid of thionyl chloride, or t-butylboroxole which melts at 20° C.

The advantage offered by this catalyst combination over activation with boron alkyl and small amounts of oxygen resides in the fast that the former can be added in more exact dosages, whereas it is always difficult from a technical point of view to add small amounts of oxygen in always the same proportion to the reaction mixture in order to obtain products of equal quality and in equal yields.

Moreover, the oxygen added often impairs the polymer. It should also be noted that adding oxygen to boron alkyls so as to produce peroxides initiates reactions that cannot be foreseen and are difficult to control so that reproducibility of the process is jeopardized.

The boron alkyls used in the process of this invention are more especially boron triethyl and boron tributyl. They may be used in a proportion of between 0.1 and 5.0%, calculated on the weight of monomers used, advantageously in a proportion of between 0.1–0.5% by weight.

The boroxoles are used in a proportion of between 0.01% and 0.1%. Polymerization can be carried out as bulk, solution or suspension process. It is generally carried out at temperatures within the range of about 0–120° C. and under superatmospheric pressure, if desired.

According to this invention, polymerization is advantageously carried out in the atmosphere of an inert gas, for example under nitrogen or a noble gas, but it can also be performed in the presence of air.

Softeners, for example, dibutyl phthalate may be added during polymerization.

The following examples serve to illustrate the invention but they are not intended to limit it thereto:

*Example 1*

A Schlenk-type tube was charged with 15 cc. n-hexane and 5 cc. vinyl acetate (the two compounds had previously been freed from dissolved air by bubbling through nitrogen). The air in the tube was expelled by pure nitrogen and 0.66 cc. freshly prepared boron triethyl were added. The whole was kept for 22 hours at 20° C. while being repeatedly shaken. Unpolymerized vinyl acetate, n-hexane and unchanged boron triethyl were then expelled with pure nitrogen. Polyvinyl acetate was obtained as a colorless resin in a yield of 2.47 grams corresponding to 53% of the theoretical. The product obtained had a K-value of 37 (according to Fikentscher).

*Example 2*

A Schlenk-type tube was charged with 35 grams vinyl acetate (blown out with nitrogen) and under nitrogen with 0.5 cc. boron triethyl, and the reaction mixture was kept for 5 hours at 60° C. with the aid of a water bath. Unreacted vinyl acetate was then expelled with nitrogen. With the exclusion of air, methanol was continuously added in an amount such that the reaction mixture remained liquid and could be blown out. The methanol was then removed in vacuo at 40° C. Polyvinyl acetate was obtained as a colorless resin in a yield of 17.5 grams corresponding to 50% of the theoretical. The product obtained had a K-value of 58 (according to Fikentscher).

The example was repeated while adding 0.05 cc. n-butyl boroxole. The polyvinyl acetate resin was obtained in a yield of 32 grams corresponding to 90% of the theoretical.

*Example 3*

A Schlenk-type tube was charged with 70 grams vinyl acetate (blown out with nitrogen) and under nitrogen with 0.25 cc. boron triethyl. The temperature was maintained for 1 hour at 40° C. by means of a water bath. The resulting polymer was isolated and a colorless resin was obtained in a yield of 5 grams corresponding to about 7% of the theoretical.

The example was repeated while adding 0.025 cc. t-butyl-boroxole. The yield was about 40 grams corresponding to 60% of the theoretical.

*Example 4*

A three-necked glass flask provided with stirrer, thermometer and reflux condenser was charged with 100 grams vinyl acetate (blown out wtih nitrogen) and 0.71 cc. boron triethyl. 300 grams of an 0.1% aqueous solution of the ammonium salt of a styrene-maleic anhydride copolymer were then added. While stirring vigorously, the whole was maintained for 6 hours and 40 minutes at 70° C. outside temperature. Unreacted monomer was then expelled with nitrogen, the bead polymer obtained was filtered off, washed and dried in vacuo. Colorless beads having a K-value of 57 (according to Fikentscher) were obtained in a yield of 21 grams.

The experiment was repeated while adding 0.1 cc. n-butyl-boroxole to the boron tributyl. After 4 hours, the yield amounted to 70%. Both experiments were run under nitrogen and the water necessary for the protective colloid solution was freed from oxygen by boiling it.

*Example 5*

A three-necked glass flask provided with stirrer, thermometer and reflux condenser was charged with 100 grams vinyl acetate (blown out with nitrogen) and 0.36 cc. boron triethyl to which 0.04 cc. n-butylboroxole had previously been added.

300 grams of an 0.1% aqueous solution of the ammonium salt of a styrene-maleic anhydride copolymer were then added. While stirring vigorously, the outside temperature was maintained for 4 hours at 70% C. Unreacted monomer was expelled with nitrogen, the bead polymer was filtered off, washed and dried in vacuo. Colorless beads having a K-value of 75 (according to Fikentscher) were obtained in a yield of 55 grams.

We claim:

1. A process for preparing macromolecular substances which comprises polymerizing at a temperature range of 0° to 120° C. a vinyl alcohol ester of a saturated monovalent aliphatic carboxylic acid of 1 to 8 carbon atoms in the presence of a combination of two catalysts, one of them being a boron trialkyl of the formula $B(R)_3$ wherein R is an alkyl radical containing 1 to 4 carbon atoms, and the other being a boroxole corresponding to the formula

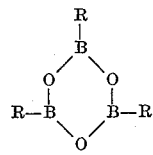

wherein R represents a hydrocarbon radical of 1 to 6 carbon atoms, said boron alkyl and boroxole being employed in amounts of 0.1 to 5% by weight and 0.01 to 1% by weight respectively based on the monomer weight.

2. The process of claim 1 wherein said vinyl alcohol ester is admixed with at least one other monomer selected from the group consisting of acrylic acid esters, methacrylic acid esters, and vinyl chloride.

3. The process of claim 1 wherein the catalyst combination consists essentially of boron triethyl and n-butyl-boroxole.

4. The process of claim 1 wherein the catalyst combination consists essentially of boron tributyl and n-butyl boroxole.

5. The process of claim 1 wherein the catalyst combination consists essentially of boron triethyl and t-butyl-boroxole.

6. The process of claim 1 wherein the catalyst combination consists essentially of boron tributyl and t-butyl-boroxole.

7. The process of claim 1 wherein said vinyl alcohol ester is vinyl acetate.

8. The process of claim 2 wherein said other monomer is an acrylic acid ester of a saturated aliphatic monohydric alcohol of 1 to 8 carbon atoms.

References Cited in the file of this patent

UNITED STATES PATENTS 2,934,526   Hoffman et al. _____ Apr. 26, 1960

OTHER REFERENCES

Furukawa et al.: Die Makromolekulare Chemie, volume 31, pages 122–139 (1959).